United States Patent
Fox et al.

(10) Patent No.: US 11,362,541 B2
(45) Date of Patent: Jun. 14, 2022

(54) TECHNOLOGIES FOR DYNAMIC FORECASTING, AGGREGATION, AND VALIDATION

(71) Applicant: Hitachi Energy Switzerland AG, Baden (CH)

(72) Inventors: Thomas Fox, Roswell, GA (US); Karl Eric Harper, Cary, NC (US)

(73) Assignee: HITACHI ENERGY SWITZERLAND AG, Baden (CH)

( * ) Notice: Subject to any disclaimer, the term of this patent is extended or adjusted under 35 U.S.C. 154(b) by 571 days.

(21) Appl. No.: 16/405,000

(22) Filed: May 7, 2019

(65) Prior Publication Data
US 2020/0358313 A1 Nov. 12, 2020

(51) Int. Cl.
H02J 13/00 (2006.01)
H02J 3/00 (2006.01)

(52) U.S. Cl.
CPC ........... *H02J 13/0062* (2013.01); *H02J 3/003* (2020.01); *H02J 2203/20* (2020.01)

(58) Field of Classification Search
CPC ..... H02J 13/0062; H02J 3/003; H02J 2203/20
See application file for complete search history.

(56) References Cited

U.S. PATENT DOCUMENTS

| | | |
|---|---|---|
| 2006/0195229 A1 | 8/2006 | Bell et al. |
| 2011/0082596 A1 | 4/2011 | Meagher et al. |
| 2012/0022713 A1 | 1/2012 | Deaver, Sr. et al. |
| 2014/0281645 A1 | 9/2014 | Sen et al. |
| 2019/0326755 A1* | 10/2019 | Fu ..................... H02J 13/00002 |
| 2020/0209430 A1* | 7/2020 | Shukla ...................... H02J 3/38 |

OTHER PUBLICATIONS

Pierre Pinson, "Verificatin of Renewable Energy Forecasts", YEQT Winter School on Energy Systems, Dec. 12, 2017, 43 pages.
"Distributed Renewables Monitoring and Forecasting Technologies Intermittent Resources Forecasting Analytics and Residential and Commercial and Industrial Solar Monitoring Technologies: Global Market Analysis and Forecasts", Navigant Research, 2017, 49 pages.

* cited by examiner

*Primary Examiner* — Manuel A Rivera Vargas
(74) *Attorney, Agent, or Firm* — Slater Matsil, LLP (57) ABSTRACT

Technologies for dynamic forecasting, aggregation, and validation may include circuitry configured to collect data indicative of power flows at multiple locations in an electrical grid, to receive one or more parameters for generation of a customized forecast indicative of predicted power flows associated with one or more of the multiple locations over a defined time period, to select a subset of the collected data that satisfies the one or more parameters, to produce a model to predict power flows in the electrical grid associated with the one or more locations, to determine whether the model is validated by determining whether a predicted production of power minus predicted losses is within a predefined range of a predicted consumption of power at the one or more locations, and to produce the customized forecast of predicted power flows associated with the one or more locations for the defined time period.

20 Claims, 5 Drawing Sheets

TECHNOLOGIES FOR DYNAMIC FORECASTING, AGGREGATION, AND VALIDATION

BACKGROUND

Renewable energy encourages a decentralized approach to power generation and ownership. In the future, as distributed energy resources (DER) supplant large baseloads, economic dispatch and management systems (MS) will become increasingly complex for utilities and retailers. The evolving energy market includes customers that are adding new power generation and storage resources and utilities and/or third party energy marketers that are entering into contracts of varying terms to sell energy to customers. However, existing forecasting models for predicting power flows (e.g., consumption and/or production) are based on specific points of load or generation, and are unable to account for changes in the available resources in the electrical grid or produce forecasts pertaining to specific types of power consumers or power producers present in the electrical grid.

SUMMARY OF THE INVENTION

In one aspect, the present disclosure provides an apparatus. The apparatus includes circuitry configured to collect data indicative of power flows at multiple locations in an electrical grid. Additionally, the circuitry is configured to receive one or more parameters for generation of a customized forecast indicative of predicted power flows associated with one or more of the multiple locations in the electrical grid over a defined time period. Further the circuitry is configured to select a subset of the collected data that satisfies the one or more parameters. The circuitry is also configured to produce, from the selected subset of the collected data, a model to predict power flows in the electrical grid associated with the one or more locations, determine whether the model is validated by determining whether a predicted production of power minus predicted losses is within a predefined range of a predicted consumption of power at the one or more locations in the electrical grid, and produce, in response to a determination that the model is validated and based on the one or more parameters, the customized forecast of predicted power flows associated with the one or more locations for the defined time period.

In another aspect, the present disclosure provides a method. The method includes collecting, by an apparatus, data indicative of power flows at multiple locations in an electrical grid. The method also includes receiving, by the apparatus, one or more parameters for generation of a customized forecast indicative of predicted power flows associated with one or more of the multiple locations in the electrical grid over a defined time period. The method also includes selecting, by the apparatus, a subset of the collected data that satisfies the one or more parameters. The method also includes producing, by the apparatus and from the selected subset of the collected data, a model to predict power flows in the electrical grid associated with the one or more locations. Additionally, the method includes determining, by the apparatus, whether the model is validated by determining whether a predicted production of power minus predicted losses is within a predefined range of a predicted consumption of power at the one or more locations in the electrical grid. Further, the method includes producing, by the apparatus and in response to a determination that the model is validated and based on the one or more parameters, the customized forecast of predicted power flows associated with the one or more locations for the defined time period.

In yet another aspect, the present disclosure provides one or more machine-readable storage media having a plurality of instructions stored thereon that, in response to being executed, cause an apparatus to collect data indicative of power flows at multiple locations in an electrical grid. The instructions also cause the apparatus to receive one or more parameters for generation of a customized forecast indicative of predicted power flows associated with one or more of the multiple locations in the electrical grid over a defined time period. Additionally, the instructions cause the apparatus to select a subset of the collected data. The subset satisfies the one or more parameters. Further, the instructions cause the apparatus to produce, from the selected subset of the collected data, a model to predict power flows in the electrical grid associated with the one or more locations and determine whether the model is validated by determining whether a predicted production of power minus predicted losses is within a predefined range of a predicted consumption of power at the one or more locations in the electrical grid. Additionally, the instructions cause the apparatus to produce, in response to a determination that the model is validated and based on the one or more parameters, the customized forecast of predicted power flows associated with the one or more locations for the defined time period.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
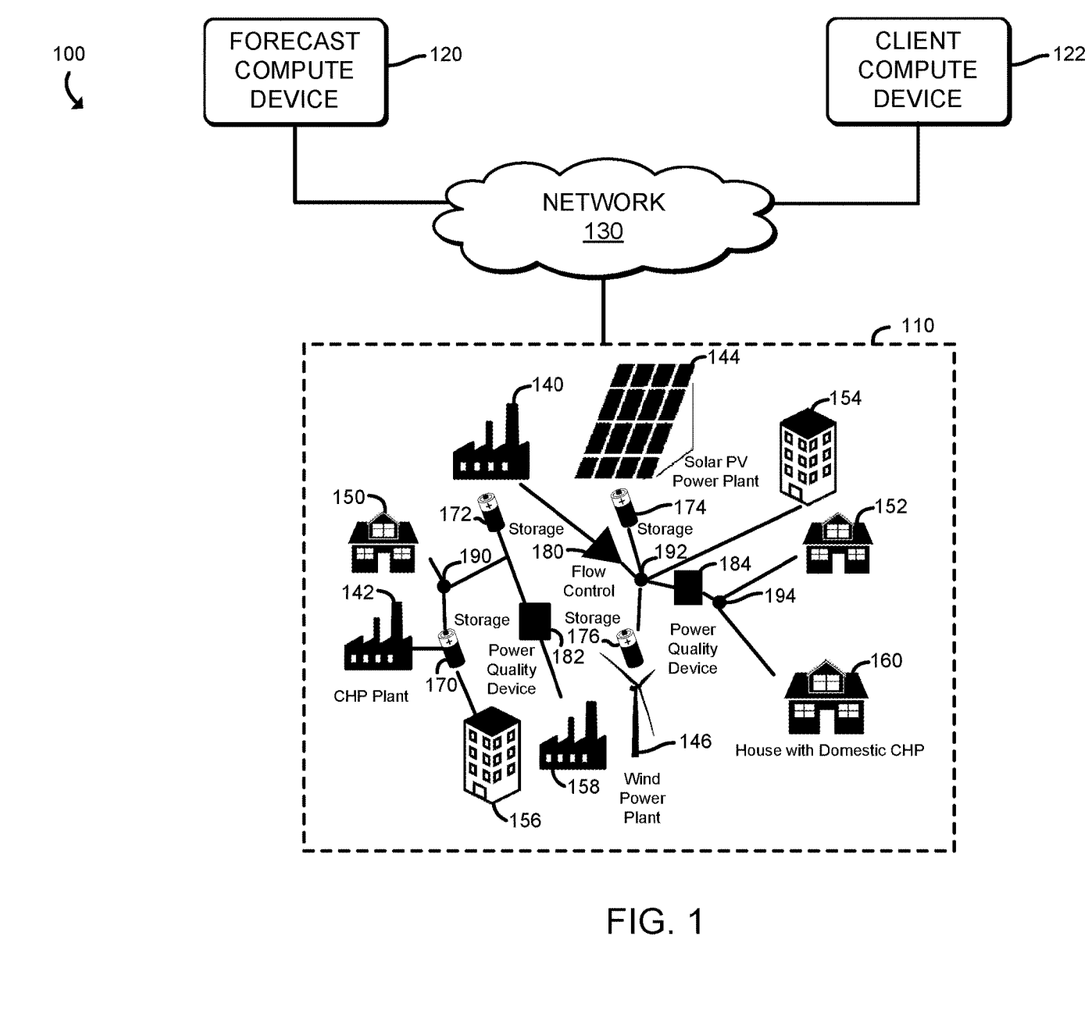
FIG. 1 is a simplified block diagram of at least one embodiment of a system for aggregating data from an electrical grid, validating forecasting models for power flows in the electrical grid, and providing customized forecasts.

Referring now to FIG. 1, a system 100 for aggregating data from an electrical grid 110, validating forecasting models for power flows in the electrical grid 110, and providing customized forecasts includes a forecast compute device 120 in communication with components of the electrical grid 110 and with a client compute device 122 through a network 130. The electrical grid 110 may include producers of power, including power generation plants 140, 142 (e.g., combined heat and power (CHP) plants), a solar power plant 144, and a wind power plant 146. Additionally, in the illustrative embodiment, the electrical grid includes consumers of power, including houses 150, 152, an office building 154, and a factory 158. Additionally, the electrical grid 110 may include a house with domestic CHP 160 (e.g., a house having equipment to produce combined heat and power, such as with micro CHP technology). The electrical grid 110 may additionally include other equipment capable of managing the flow of power through the electrical grid 110, including energy storage devices (e.g., batteries) 170, 172, 174, 176, a flow control device 180, and power quality devices 182, 184 (e.g., devices configured to maintain power at a target quality by continually monitoring and adjusting a voltage, frequency, and/or waveform of the power). The electrical grid 110 may additionally include feeders 190, 192, 194, each of which is embodied as a location where power may be combined from different producers and provided to different consumers in the electrical grid 110.

In operation, the forecast compute device 120 enables distribution network operators to forecast load and generation on their network (e.g., electrical grid 110) as combinations and locations of distributed energy resources (DER) evolve and change. By predicting the available generation and load obligations, distribution network operators may operate the electrical grid 110 more reliably and efficiently, benefitting market participants, aggregators, and individual consumers of power. Rather than relying on a pre-defined set of load and/or generation points and their corresponding historical data and associated independent variables, the forecast compute device 120 combines historical data and corresponding independent data at the time of forecast (e.g., in response to a request from the client compute device 122 for a forecast) based on user-defined parameters common to a targeted subset of the collected data (e.g., a subset of the collected data pertaining to a particular type of power consumer). For example, the forecast compute device 120 may produce a forecast of power flows for customers in a specific geographic area and/or customers associated with a certain type of electrical equipment (e.g., a solar power plant, a particular feeder, etc.).

In the illustrative embodiment, the forecast compute device 120 may produce forecasts, on request, at the account (e.g., power consumer, such as a house 150), feeder, or aggregator (e.g., multiple feeders) levels. In each scenario, the forecast compute device 120 utilizes collected data (e.g., historical data) indicative of power flows in the electrical grid 110, analyzes the data using statistical techniques or the like to determine relationships and patterns, and develops one or more models to determine how much power is produced and consumed (e.g., over time, with respect to changes in weather, etc.). The forecast compute device 120 may produce models for any subset or class of accounts. For example, residential homes with similar solar equipment in the same locality may be considered a class. In doing so, the forecast compute device 120 uses data indicative of a topology of the electrical grid 110 (e.g., data indicative of electrical equipment installed in the electrical grid 110) to account for (e.g., model) power losses due to the presence of the electrical equipment (e.g., due to inefficiencies in the electrical equipment). Further, the forecast compute device 120 validates that a given model takes into account all power flows that may affect a forecast (e.g., a model of power flows at a feeder 190) by confirming that predicted power production, minus losses due to the known electrical equipment is within a predefined range of (e.g., equal to or plus or minus a certain percentage, such as 1%) of the predicted power consumption by the power consumers associated with the forecast (e.g., power consumers 150, 156 connected to the feeder 190). In other words, the forecast compute device 120, in operation, may determine whether the model complies with Kirchhoff's first law, which states that current flows at a given node must sum to zero, before providing a forecast produced by the model to a requestor of the forecast (e.g., an operator of the client compute device 122).

Figure 2:
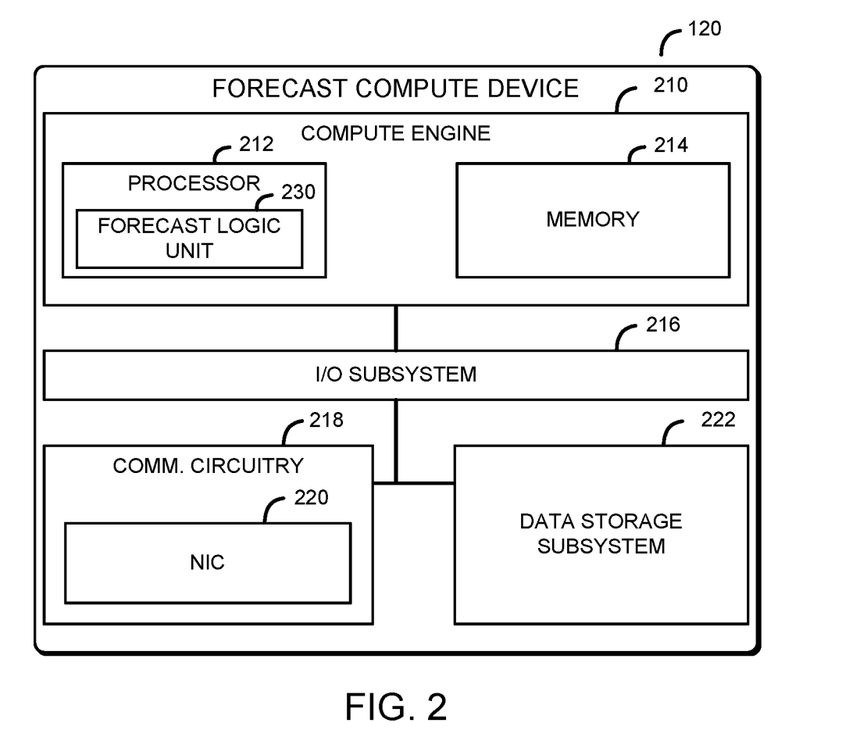
FIG. 2 is a simplified block diagram of at least one embodiment of a forecast compute device included in the system of FIG. 1.

Referring now to FIG. 2, the forecast compute device 120 may be embodied as any type of device capable of performing the functions described herein. As shown in FIG. 2, the illustrative forecast compute device 120 includes a compute engine 210, an input/output (I/O) subsystem 216, communication circuitry 218, and a data storage subsystem 222. Of course, in other embodiments, the forecast compute device 120 may include other or additional components, such as those commonly found in a computer (e.g., a display, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a microcontroller, a single or multi-core processor(s), or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, the processor 212 includes a forecast logic unit 230 which may be embodied as any device or circuitry (e.g., reconfigurable circuitry, a field programmable gate array (FPGA), an application specific integrated circuit (ASIC), etc.) capable of offloading, from other functions of the processor 212, the functions related to analyzing a set of collected data from the electrical grid 110 to produce a customized forecast pertaining to a particular subset of the collected data, producing one or more models to generate the customized forecast, and validating the model(s) (e.g., determining whether the model(s) comply with Kirchhoff's first law, as described above). Though shown as being integrated into the processor 212, in some embodiments the forecast logic unit 230 may be located in a different portion of the forecast compute device 120 (e.g., as a discrete unit).

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation, such as data indicative of power flows at one or more locations in the electrical grid 110, one or more models for predicting power flows in the electrical grid 110, applications, programs, libraries, and drivers.

The compute engine 210 is communicatively coupled to other components of the forecast compute device 120 via the I/O subsystem 216, which may be embodied as circuitry and/or components to facilitate input/output operations with the compute engine 210 (e.g., with the processor 212, the forecast logic unit 230, the main memory 214) and other components of the forecast compute device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the forecast compute device 120, into the compute engine 210.

The communication circuitry 218 may be embodied as any communication circuit, device, or collection thereof, capable of enabling communications over a network between the forecast compute device 120 and another device (e.g., the client compute device 122, components of the electrical grid 110, etc). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the forecast compute device 120 to connect with another device. In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the processor 212. Additionally or alternatively, in such embodiments, the local memory of the NIC 218 may be integrated into one or more components of the forecast compute device 120 at the board level, socket level, chip level, and/or other levels.

The data storage subsystem 222 may be embodied as any type of devices configured for short-term or long-term storage of data such as, for example, memory devices and circuits, memory cards, hard disk drives, solid-state drives, or other data storage devices. In the illustrative embodiment, the data storage subsystem includes data collected from the electrical grid 110 indicative of power flows at multiple locations over time, weather data indicative of weather at the locations of the electrical grid 110 over time, data indicative of the locations and types of electrical equipment present in the electrical grid 110, and data indicative of power producers and power consumers present in the electrical grid 110 (e.g., defining a topology of the electrical grid 110).

The client compute device 122 may have components similar to those described in FIG. 2 with reference to the forecast compute device 120. The description of those components of the forecast compute device 120 is equally applicable to the description of components of the client compute device 122, with the exception that, in the illustrative embodiment the client compute device 122 may not include the forecast logic unit 230. Further, it should be appreciated that any of the forecast compute device 120 and the client compute device 122 may include other components, sub-components, and devices commonly found in a computing device, which are not discussed above in reference to the forecast compute device 120 and not discussed herein for clarity of the description. Similarly, the devices 140, 142, 144, 146, 150, 152, 154, 156, 160, 170, 172, 174, 176, 180, 182, 184, 190, 192, 194 in the electrical grid 110 may include components similar to those of the forecast compute device 120 and the client compute device 122.

The forecast compute device 120, the client compute device 122, and the devices 140, 142, 144, 146, 150, 152, 154, 156, 160, 170, 172, 174, 176, 180, 182, 184, 190, 192, 194 in the electrical grid 110 are illustratively in communication via the network 130, which may be embodied as any type of wired or wireless communication network capable of communicating data, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
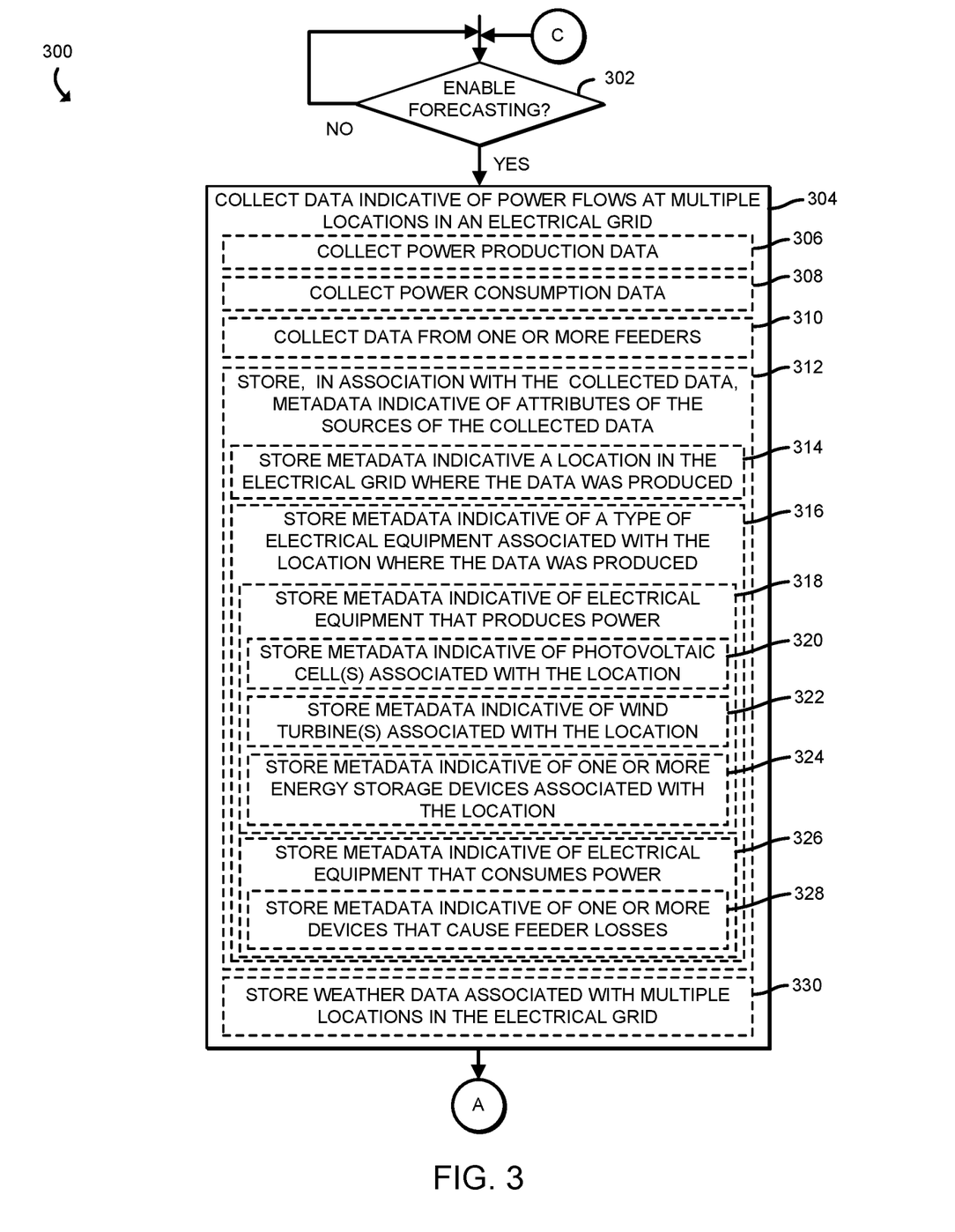
FIGS. 3-5 are a simplified block diagram of at least one embodiment of a method for aggregating data from an electrical grid, validating forecasting models for power flows in the electrical grid, and providing customized forecasts that may be performed by the forecast compute device of FIGS. 1 and 2.

Referring now to FIG. 3, the forecast compute device 120, in operation may perform a method 300 for aggregating data from an electrical grid (e.g., the electrical grid 110), validating forecasting models for power flows in the electrical grid 110, and providing a customized forecast (e.g., to the client compute device 122). The method 300 begins with block 302, in which the forecast compute device 120 determines whether to enable dynamic forecasts (e.g., whether to perform the remainder of the method 300). In doing so, the forecast compute device 120 may determine to enable dynamic forecasting in response to a determination that the forecast compute device 120 has received a request to enable dynamic forecasting (e.g., from the client compute device 122), in response to a determination that the forecast compute device 120 is equipped with the forecast logic unit 230, and/or based on other factors. Regardless, in response to a determination to enable dynamic forecasting, the method 300 advances to block 304, in which the forecast compute device 120 collects power production data, which may be embodied as any data indicative of power flows at multiple locations in an electrical grid (e.g., in the electrical grid 110). In doing so, and as indicated in block 306, the forecast compute device 120 may collect power production data which may be embodied as any data indicative of amounts of power produced at locations in the electrical grid 110 (e.g., at the power generation plants 140, 142, the solar power plant 144, and the wind power plant 146, etc.) over time. As indicated in block 308, the forecast compute device 120 also collects power consumption data, which may be embodied as any data indicative of amounts of power consumed at locations in the electrical grid 110 (e.g., houses 150, 152, the office building 154, and the factory 158) over time. Additionally, as indicated in block 310, the forecast compute device 120, in the illustrative embodiment, collects data from one or more feeders 190, 192, 194 (e.g., data indicative of power flows into the feeder, data indicative of power flows out of the feeder, and data indicative of power lost due to inefficiencies in electrical equipment associated with the feeder).

As indicated in block 312, the forecast compute device 120 stores, in association with the collected data, metadata (e.g., tags) indicative of attributes of the sources of the collected data. For example, and as indicated in block 314, the forecast compute device 120 may store metadata indicative of a location in the electrical grid 110 where sets of received data were produced (e.g., by associating Internet Protocol addresses of devices in the electrical grid 110 that sent data to the forecast compute device 120 with corresponding location data, which may be embodied as geographic coordinates or other identifiers indicative of locations within the electrical grid 110). As indicated in block 316, the forecast compute device 120 may store metadata indicative of a type of electrical equipment (e.g., transformers, power quality devices, flow control devices, etc.) associated with the location where the collected data was produced. As indicated in block 318, the forecast compute device 120 may store metadata indicative of electrical equipment that produces power (e.g., data indicative of the specific type of equipment associated with power production at a particular location). For example, and as indicated in block 320, the forecast compute device 120 may store metadata indicative of photovoltaic cell(s) associated with a location (e.g., the location of the solar power plant 144). Similarly, as indicated in block 322, the forecast compute device 120 may store metadata indicative of wind turbine(s) associated with a location (e.g., the location of the wind power plant 146). As indicated in block 324, the forecast compute device 120 may store metadata indicative of one or more energy storage devices associated with a location or locations (e.g., the locations of the energy storage devices 170, 172, 174, 176). As indicated in block 326, the forecast compute device 120, in the illustrative embodiment, stores metadata indicative of electrical equipment that consumes power (e.g., locations of houses 150, 152, the factory 158, the office buildings 154, 156, etc.). Further, the forecast compute device 120, in the illustrative embodiment, stores metadata indicative of devices (transformers, power quality devices, flow control devices, etc.) that cause power losses associated with feeders (e.g., losses that may be accounted for when summing the power flows at feeders), as indicated in block 328. Additionally, the forecast compute device 120 may store weather data (e.g., temperature, atmospheric conditions, wind speed and direction, sunlight duration and intensity, etc.) associated with locations in the electrical grid 110, as indicated in block 330. In some embodiments, the forecast compute device 120 may collect additional data, including data indicative of a configuration of the electrical grid (e.g., a network topology), a capacity of the electrical grid (e.g., nameplate rating(s)), a state of the electrical grid (e.g., breaker settings), and/or an expert assessment of the electrical grid (e.g., maintenance records). Subsequently, the method 300 advances to block 332 of FIG. 4, in which the forecast compute device 120 receives (e.g., from the client compute device 122) one or more parameters usable in the generation of a customized forecast indicative of predicted power flows in the electrical grid (e.g., in one or more specific portions of the electrical grid 110) over a defined time period.

Figure 4:
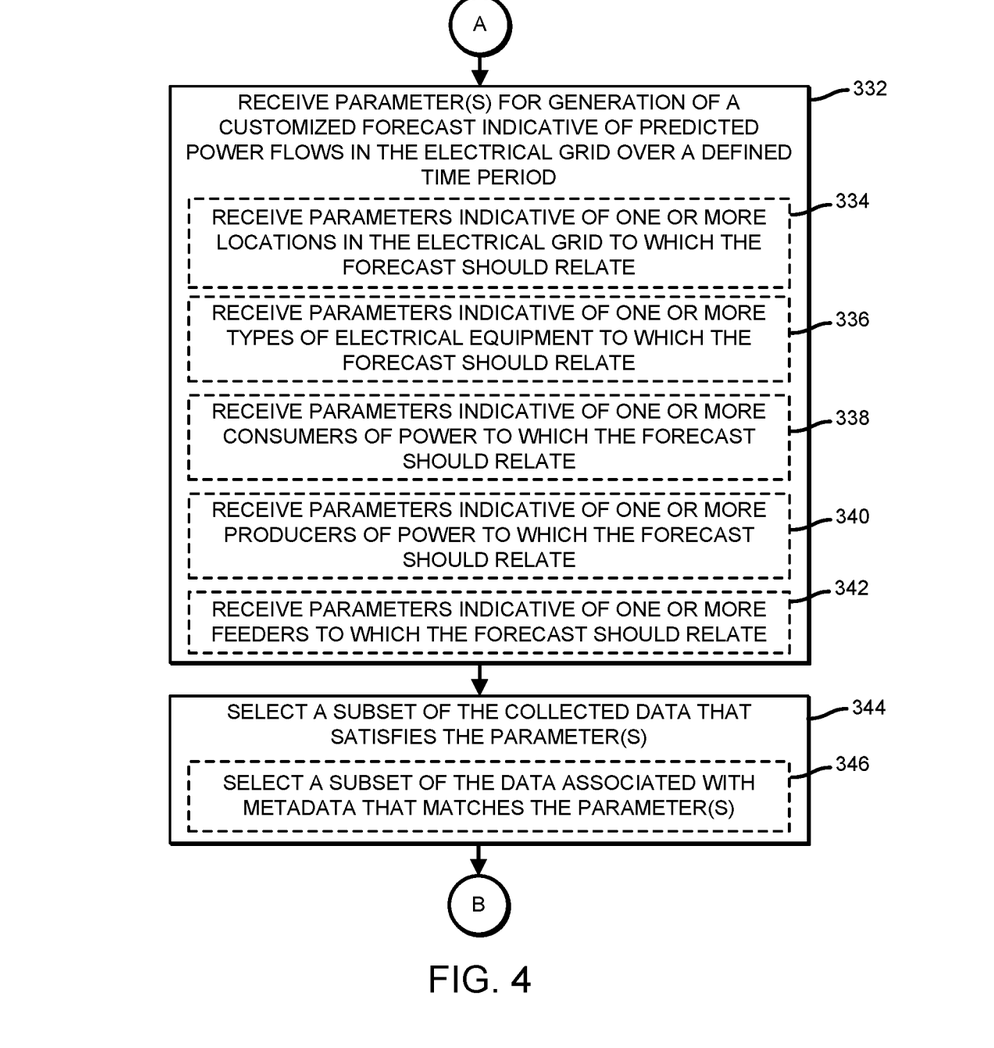

Referring now to FIG. 4, in receiving the one or more parameters, the forecast compute device 120 may receive parameters indicative of one or more locations in the electrical grid to which the forecast should relate (e.g., a geographic region), as indicated in block 334. As indicated in block 336, the forecast compute device 120 may additionally or alternatively receive parameters indicative of one or more types of electrical equipment to which the forecast should relate (e.g., a forecast pertaining specifically to energy produced by and consumed from the solar power plant 144). The forecast compute device 120 may receive parameters indicative of one or more consumers of power to which the forecast should relate (e.g., a forecast pertaining specifically to power produced for and consumed by the house 150 and the office building 156), as indicated in block 338. As indicated in block 340, the forecast compute device 120 may receive parameters indicative of one or more producers of power to which the forecast should relate (e.g., a forecast pertaining specifically to power produced by power plants 140, 144, 146). Additionally or alternatively, the forecast compute device 120 may receive parameters indicative of one or more feeders to which the forecast should relate (e.g., a forecast pertaining specifically to power provided to and consumed from the feeder 190), as indicated in block 342. Subsequently, in block 344, the forecast compute device 120 selects a subset of the collected data (e.g., from block 304) that satisfies the parameter(s) (e.g., the parameter(s) from block 332). In doing so, and as indicated in block 346, the forecast compute device 120 selects a subset of the collected data that is associated with metadata that matches (e.g., contains key words or other data indicative of) the parameter(s). Subsequently, the method 300 advances to block 348 of FIG. 5, in which the forecast compute device 120 produces one or more models (e.g., each a mathematical relationship or the like between an independent variable, such as time, and a dependent variable, such as power production and consumption) from the selected subset of the collected data to predict power flows in the electrical grid 110.

Figure 5:
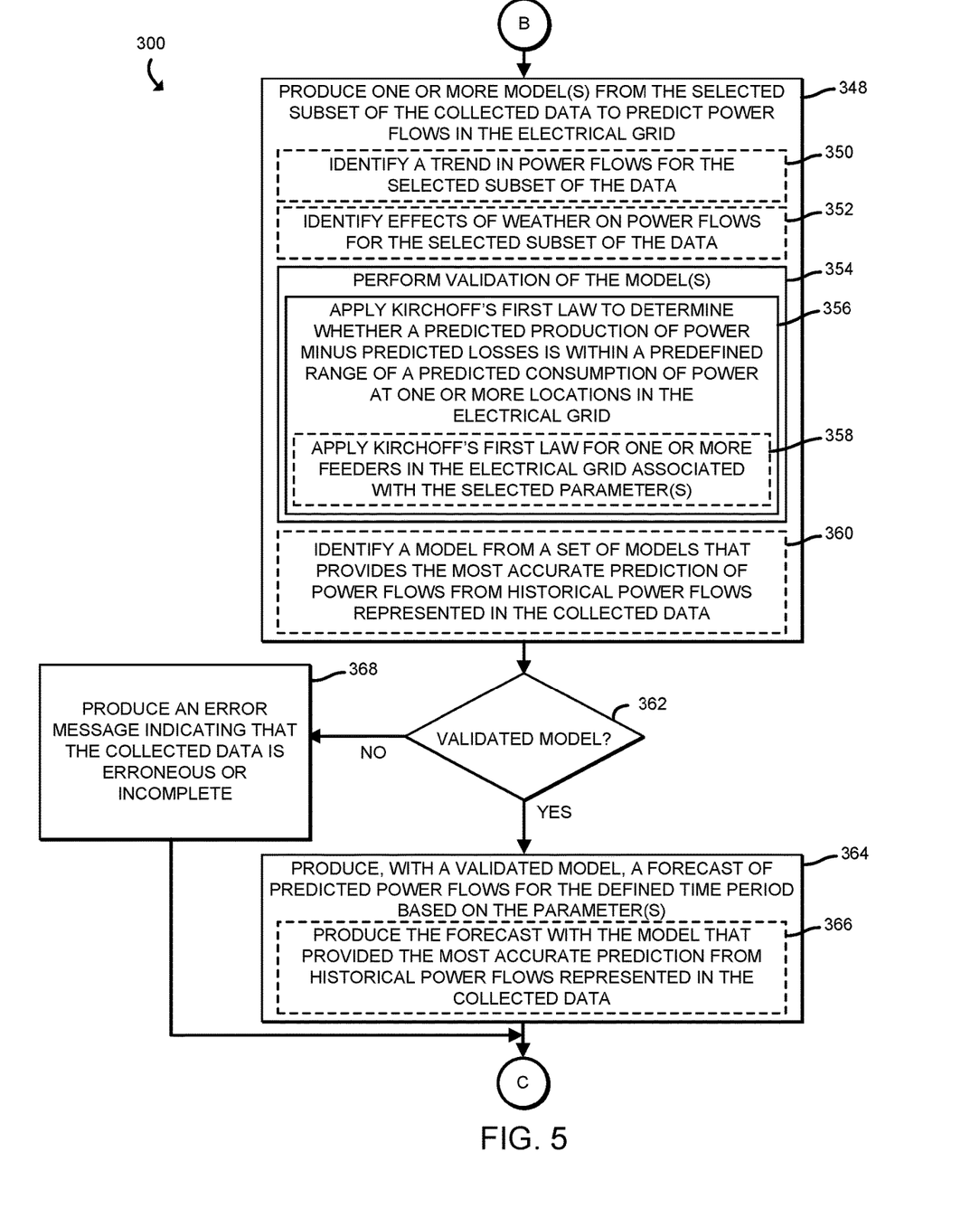

Referring now to FIG. 5, in producing one or more models, the forecast compute device 120 may identify a trend in power flows for the selected subset of the collected data (e.g., the subset selected in block 344 of FIG. 4), as indicated in block 350. Further, and as indicated in block 352, the forecast compute device 120 may identify effects of weather on power flows for the selected subset of the data (e.g., increases in power production and consumption when the temperature deviates from a reference temperature by a particular amount). In the illustrative embodiment, the forecast compute device 120 performs a validation of any models that have been produced, as indicated in block 354. In doing so, and as indicated in block 356, the forecast compute device 120 applies Kirchhoff's first law to determine whether a predicted production of power (e.g., a prediction made by the model as to an amount of power that will be produced) minus predicted losses (e.g., a prediction as to the amount of power will be lost due to inefficiencies in known electrical equipment in the electrical grid 110) is within a predefined range (e.g., plus or minus 1%) of a predicted consumption of power at one or more locations (e.g., one or more locations in the electrical grid 110 that pertain to the subset of the collected data) in the electrical grid 110. For example, and as indicated in block 358, the forecast compute device 120 may apply Kirchhoff's first law for one or more feeders the in the electrical grid 110 if the one or more feeders are associated with the selected parameters (e.g., if power production and consumption data associated with the one or more feeders is represented in the subset of the collected data). In block 360, if multiple models were produced, the forecast compute device 120 may identify one of the models from the set of produced models that provides the most accurate prediction of power flows based on historical power flows represented in the collected data. In other words, the forecast compute device 120 uses each model to predict power production and consumption data for a previous time period for which the actual power production and consumption data is already known and determines an accuracy with which the model predicted the actual power production and consumption.

In block 362, the forecast compute device 120 determines the subsequent course of action based on whether at least one validated model is available (e.g., validated using the operations associated with block 354). If so, the method 300 advances to block 364, in which the forecast compute device 120 produces, with a validated model, a forecast of predicted power flows (e.g., predicted production and predicted consumption) for the defined time period (e.g., a future time period for which the requested forecast is to be generated) based on the parameters (e.g., the parameters from block 332). In doing so, and as indicated in block 366, if multiple validated models are available, the forecast compute device 120 produces the forecast with the model that provided the most accurate prediction from the historical power flows represented in the collected data (e.g., the model identified as the most accurate in block 360). After the forecast is produced, the forecast compute device 120 may provide the forecast to a requesting device (e.g., the client compute device 122) such as by sending data indicative of the forecast to the requesting device through the network 130.

Referring back to block 362, if the forecast compute device 120 determines that no validated models are available, the method 300 instead branches to block 368 in which the forecast compute device 120 produces an error message indicating that the collected data is erroneous or incomplete. For example, the forecast compute device 120 may produce an error message indicating that collected data pertaining to electrical equipment present in the electrical grid is erroneous or incomplete (e.g., collected data indicative of the topology of the electrical grid 110 is missing data regarding electrical equipment that is present and causing losses). In response, an operator of the forecast compute device 120 may provide the missing data to the forecast compute device 120 to enable the forecast compute device 120 to produce models that satisfy the validation process of block 354 (e.g., models that satisfy Kirchhoff's first law). Subsequently, either after a forecast is produced in block 364 or after an error message is produced in block 368, the method 300 may loop back to block 302 of FIG. 3 in which the forecast compute device 120 may determine whether to continue to enable dynamic forecasting.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. An apparatus comprising:
   circuitry configured to:
   collect data indicative of power flows at multiple locations in an electrical grid;
   receive one or more parameters for generation of a customized forecast indicative of predicted power flows associated with one or more of the multiple locations in the electrical grid over a defined time period;
   select a subset of the collected data, wherein the subset satisfies the one or more parameters;
   produce, from the selected subset of the collected data, a model to predict power flows in the electrical grid associated with the one or more locations;
   determine whether the model is validated by determining whether a predicted production of power minus predicted losses is within a predefined range of a predicted consumption of power at the one or more locations in the electrical grid; and
   produce, in response to a determination that the model is validated and based on the one or more parameters, the customized forecast of predicted power flows associated with the one or more locations for the defined time period.

2. The apparatus of claim 1, wherein to collect data indicative of power flows comprises to collect data indicative of power production from at least one of the multiple locations in the electrical grid.

3. The apparatus of claim 1, wherein to collect data indicative of power flows comprises to collect data indicative of power consumption from at least one of the multiple locations in the electrical grid.

4. The apparatus of claim 1, wherein to collect data indicative of power flows comprises to collect data indicative of power flows from one or more feeders of the electrical grid.

5. The apparatus of claim 1, wherein to collect data indicative of power flows comprises to store, in association with the collected data, metadata indicative of attributes of sources of the collected data.

6. The apparatus of claim 5, wherein to store metadata comprises to store metadata indicative of a location in the electrical grid.

7. The apparatus of claim 5, wherein to store metadata comprises to store metadata indicative of a type of electrical equipment.

8. The apparatus of claim 7, wherein to store metadata indicative of a type of electrical equipment comprises to store metadata indicative of electrical equipment that produces power.

9. The apparatus of claim 7, wherein to store metadata indicative of a type of electrical equipment comprises to store metadata indicative of electrical equipment that consumes power.

10. The apparatus of claim 7, wherein to store metadata indicative of a type of electrical equipment comprises to store metadata indicative of electrical equipment that loses power.

11. The apparatus of claim 1, wherein the circuitry is further to store data indicative of weather in association with the data indicative of power flows in the electrical grid.

12. The apparatus of claim 1, wherein to receive one or more parameters comprises to receive one or more parameters indicative of the one or more locations in the power grid to which the customized forecast is to relate.

13. The apparatus of claim 1, wherein to receive one or more parameters comprises to receive one or more types of electrical equipment to which the customized forecast is to relate.

14. The apparatus of claim 1, wherein to receive one or more parameters comprises to receive one or more power consumers to which the customized forecast is to relate.

15. The apparatus of claim 1, wherein to receive one or more parameters comprises to receive one or more power producers to which the customized forecast is to relate or to receive one or more feeders of the electrical grid to which the customized forecast is to relate.

16. The apparatus of claim 1, wherein to select a subset of the collected data that satisfies the one or more parameters comprises to select a subset of data associated with metadata that matches the one or more parameters.

17. The apparatus of claim 1, wherein to produce a model comprises to identify a trend in power flows for the selected subset of the collected data or to identify one or more effects of weather on power flows for the selected subset of the collected data.

18. The apparatus of claim 1, wherein the circuitry is further configured to collect data indicative of a configuration of the electrical grid, a capacity of the electrical grid, one or more environment conditions, a state of the electrical grid, or an expert assessment of the electrical grid.

19. A method comprising:
collecting, by an apparatus, data indicative of power flows at multiple locations in an electrical grid;
receiving, by the apparatus, one or more parameters for generation of a customized forecast indicative of predicted power flows associated with one or more of the multiple locations in the electrical grid over a defined time period;
selecting, by the apparatus, a subset of the collected data, wherein the subset satisfies the one or more parameters;
producing, by the apparatus and from the selected subset of the collected data, a model to predict power flows in the electrical grid associated with the one or more locations;
determining, by the apparatus, whether the model is validated by determining whether a predicted production of power minus predicted losses is within a predefined range of a predicted consumption of power at the one or more locations in the electrical grid; and
producing, by the apparatus and in response to a determination that the model is validated and based on the one or more parameters, the customized forecast of predicted power flows associated with the one or more locations for the defined time period.

20. One or more non-transitory machine-readable storage media comprising a plurality of instructions stored thereon that, in response to being executed, cause an apparatus to:
collect data indicative of power flows at multiple locations in an electrical grid; receive one or more parameters for generation of a customized forecast indicative of predicted power flows associated with one or more of the multiple locations in the electrical grid over a defined time period;
select a subset of the collected data, wherein the subset satisfies the one or more parameters;
produce, from the selected subset of the collected data, a model to predict power flows in the electrical grid associated with the one or more locations;
determine whether the model is validated by determining whether a predicted production of power minus predicted losses is within a predefined range of a predicted consumption of power at the one or more locations in the electrical grid; and
produce, in response to a determination that the model is validated and based on the one or more parameters, the customized forecast of predicted power flows associated with the one or more locations for the defined time period.

* * * * *